US007643843B2

(12) United States Patent
Pan et al.

(10) Patent No.: US 7,643,843 B2
(45) Date of Patent: Jan. 5, 2010

(54) METHOD AND SYSTEM FOR TRANSMIT POWER CONTROL IN A MULTIPLE-INPUT MULTIPLE-OUTPUT WIRELESS COMMUNICATION SYSTEM

(75) Inventors: Jung-Lin Pan, Selden, NY (US); Robert Lind Olesen, Huntington, NY (US); Yingming Tsai, Boonton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 457 days.

(21) Appl. No.: 11/152,511

(22) Filed: Jun. 14, 2005

(65) Prior Publication Data

US 2006/0281422 A1    Dec. 14, 2006

(51) Int. Cl.
*H04B 7/00* (2006.01)

(52) U.S. Cl. .................. 455/522; 455/69; 455/126; 455/245.1

(58) Field of Classification Search ............ 455/69, 455/522, 127.1, 127.5, 343.1–343.6, 245.1, 455/572–574
See application file for complete search history.

(56) References Cited

U.S. PATENT DOCUMENTS 5,713,074 A * 1/1998 Hulbert ................ 455/69

| 7,068,981 | B2 * | 6/2006 | Sim ...................... 455/101 |
| 7,260,366 | B2 * | 8/2007 | Lee et al. ............... 455/102 |
| 2003/0060173 | A1 | 3/2003 | Lee et al. |
| 2004/0081073 | A1 | 4/2004 | Walton et al. |
| 2004/0081260 | A1 | 4/2004 | Matsusaka |
| 2004/0082356 | A1 | 4/2004 | Walton et al. |
| 2004/0179627 | A1 | 9/2004 | Ketchum et al. |
| 2006/0234751 | A1 * | 10/2006 | Horng et al. ........... 455/522 |

* cited by examiner

*Primary Examiner*—Lana N Le
*Assistant Examiner*—RuiMeng Hu
(74) *Attorney, Agent, or Firm*—Volpe and Koenig PC

(57) ABSTRACT

The present invention is related to a method and system for transmit power control in a multiple-input multiple-output (MIMO) wireless communication system. Both a transmitter and a receiver comprise multiple antennae for transmission and reception. The transmitter comprises a power allocation unit for controlling transmit power based on a feedback received from the receiver. The receiver comprises a channel estimator and a singular value decomposition (SVD) unit. The channel estimator generates a channel matrix from a signal received from the transmitter and the SVD unit decomposes the channel matrix into D, U and V matrices. The receiver sends a feedback generated based on output from the SVD unit to the transmitter for controlling the transmit power. The feedback may be one of an eigenvalue, a transmit power level or a power control bit or command. A hybrid scheme for selecting one of them based on channel condition may be implemented.

8 Claims, 5 Drawing Sheets

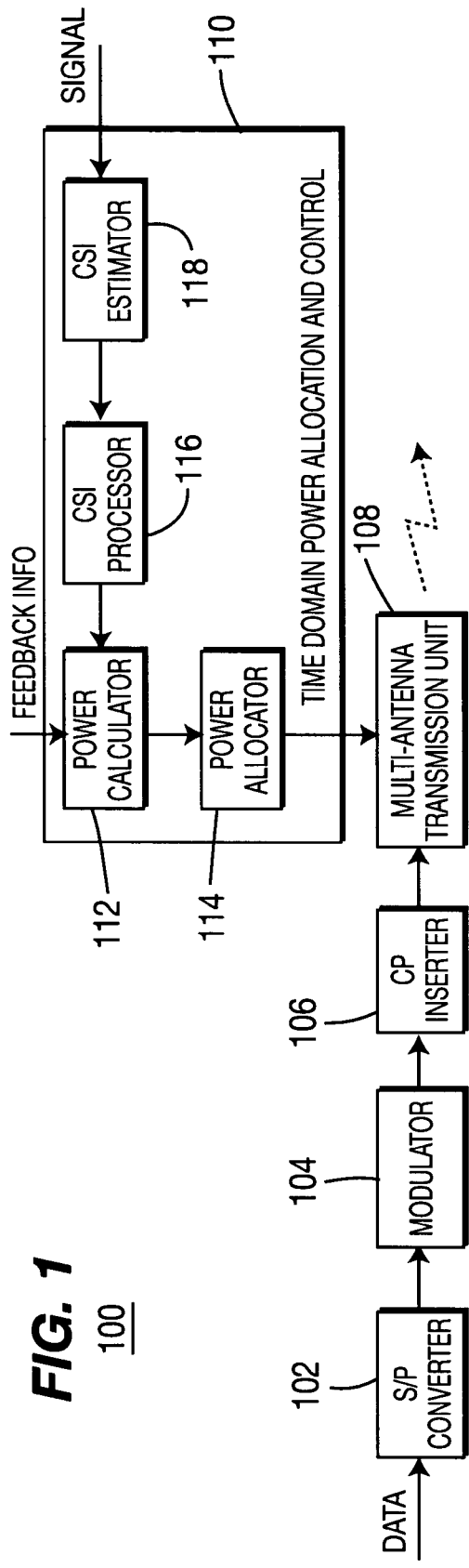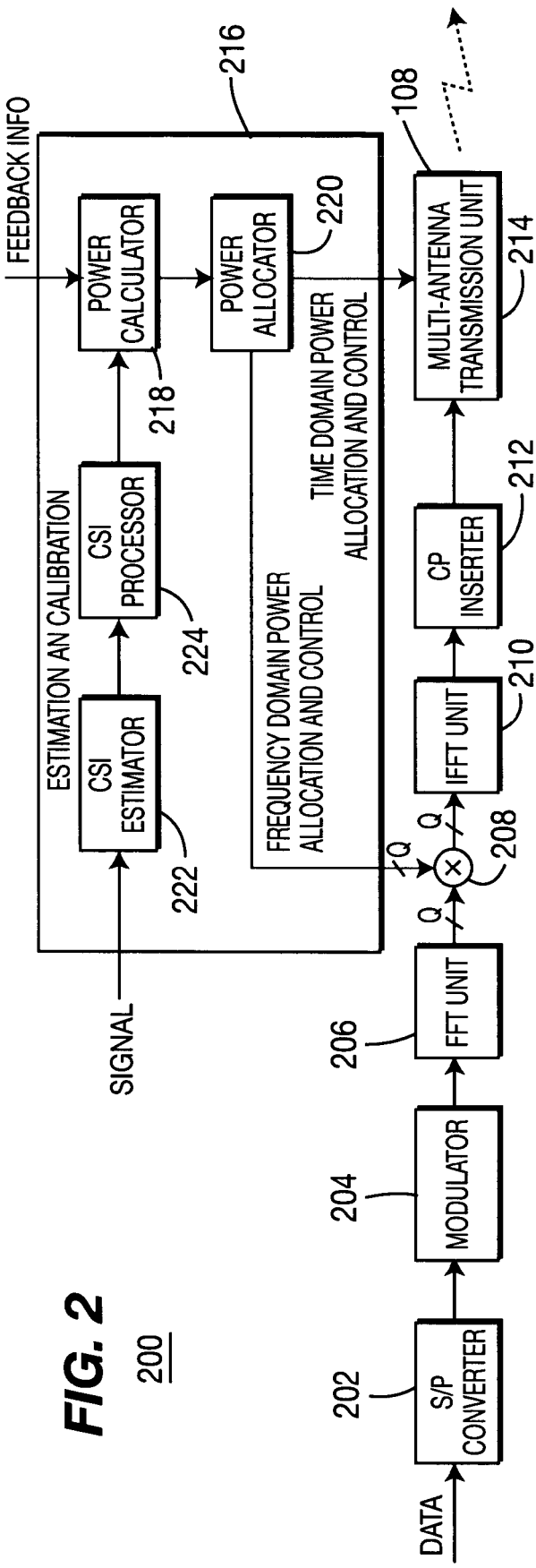

METHOD AND SYSTEM FOR TRANSMIT POWER CONTROL IN A MULTIPLE-INPUT MULTIPLE-OUTPUT WIRELESS COMMUNICATION SYSTEM

FIELD OF INVENTION

The present invention is related to a wireless communication system. More particularly, the present invention is related to a method and system for transmit power control in a multiple-input multiple-output (MIMO) wireless communication system.

BACKGROUND

A MIMO communication system employs multiple transmit antennas and receive antennas for transmission and reception. Generally, a capacity and performance are improved as the number of transmit and receive antenna increases. With multiple antennas, multiple channels are established between the transmitter and the receiver.

Generally, a transmitter is in restriction on transmit power and therefore should implement transmit power control. The transmitter allocates transmit power within the allowable maximum transmit power limit. Each channel of the MIMO system experiences different channel conditions. For example, multipath and fading conditions may vary on each channel.

Some systems use single carrier with frequency domain equalization (SC-FDE) at a receiver which uses no feedback. Therefore, these systems suffer from poor system throughput and capacity. Other systems use slow feedback systems.

SUMMARY

The present invention is related to a method and system for transmit power control in a MIMO wireless communication system. Both a transmitter and a receiver comprise multiple antennas for transmission and reception. The transmitter comprises a power allocation unit for controlling transmit power based on a feedback received from the receiver. The receiver comprises a channel estimator and a singular value decomposition (SVD) unit. The channel estimator generates a channel matrix from a signal received from the transmitter and the SVD unit decomposes the channel matrix into D, U and V matrices. The receiver sends a feedback generated based on output from the SVD unit to the transmitter for controlling the transmit power. The feedback may be one of an eigenvalue, a transmit power level or a power control bit or command. A hybrid scheme for selecting one of them based on a channel condition may be implemented.

BRIEF DESCRIPTION OF THE DRAWINGS

FIG. 1 is a block diagram of a transmitter for antenna domain transmit power allocation in accordance with one embodiment.

FIG. 2 is a block diagram of a transmitter for joint frequency-antenna domain power allocation in accordance with another embodiment.

DETAILED DESCRIPTION OF THE PREFERRED EMBODIMENTS

Figure 3:
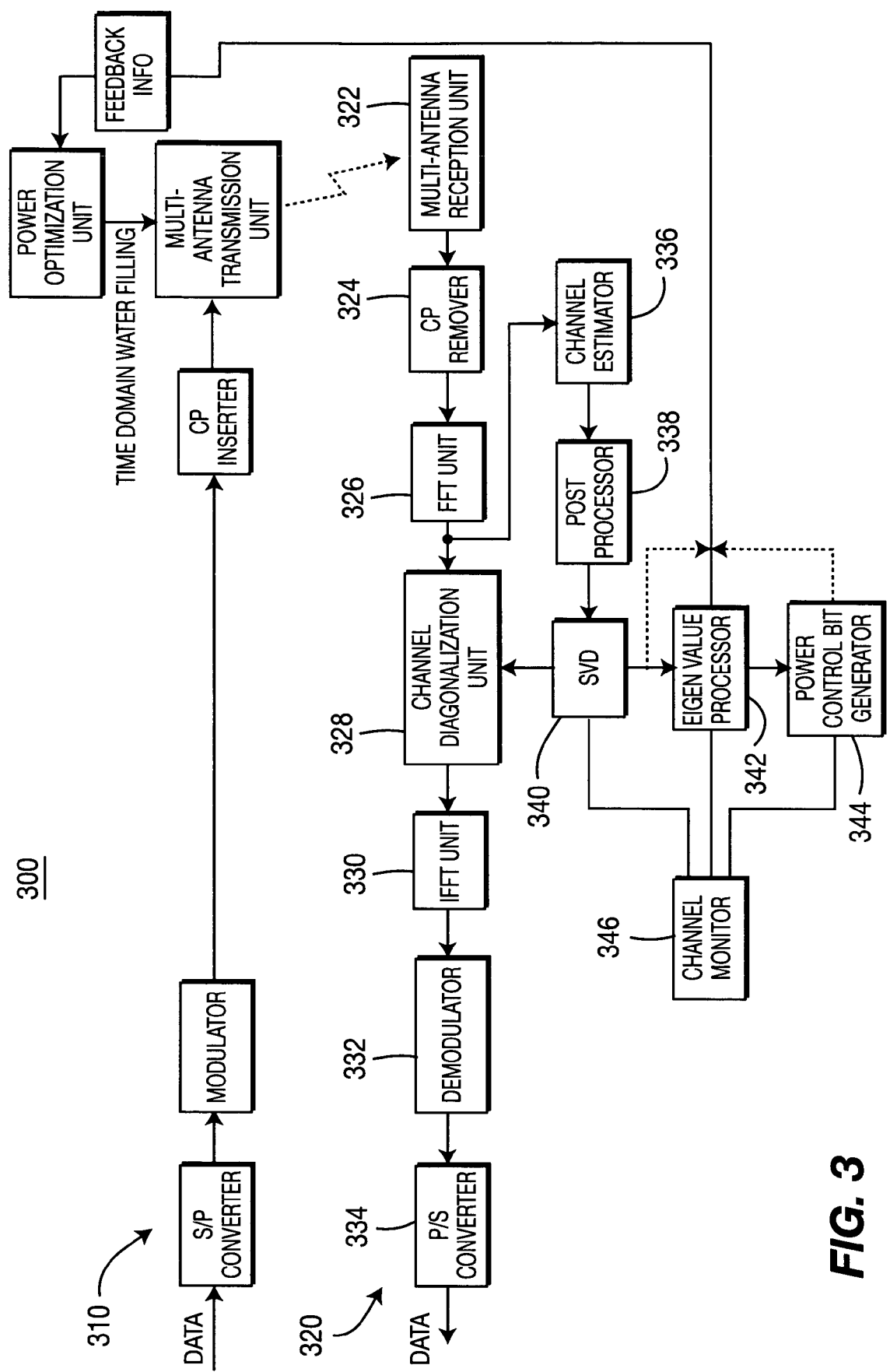
FIG. 3 is a block diagram of a system for transmit power control in accordance with one embodiment.

The features of the present invention may be incorporated into an integrated circuit (IC) or be configured in a circuit comprising a multitude of interconnecting components.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment. The transmitter or receiver features of the following embodiments can be utilized in a WTRU, base station or both.

Fast feedback and transmit power optimization for high data rate high speed MIMO system is provided. Three power allocation and control embodiments are provided. The first uses space-domain power allocation and control; the second uses joint space-frequency domain power allocation and control; and the third uses frequency domain power allocation and control.

FIG. 1 is a block diagram of a transmitter 100 for antenna domain transmit power allocation in accordance with one embodiment. The transmitter 100 comprises a serial-to-parallel (S/P) converter 102, a modulator 104, a cyclic prefix (CP) inserter 106, multiple antennae 108 and a power optimization unit 110. Input data is converted to a plurality of parallel data streams by the S/P converter 102 and the data streams are modulated by the modulator 104. The modulator 104 can use any kind of modulation techniques such as QPSK, QAM or other types of modulation techniques. A CP is then inserted into the data streams by the CP inserter 106 for preventing interblock interference. The data streams are then forwarded to the antennae 108 for transmission while the power optimization unit 110 scales transmit power for each antenna within the maximum allowable transmit power limit.

The power optimization unit 110 may scale transmit power either based on a feedback from a communicating entity, (generally in a frequency division duplex (FDD) mode), or based on received signal from the communicating entity, (generally in a time division duplex (TDD) mode).

The total allowable transmit power is $P_T$. In accordance with this embodiment, the total transmit power is uniformly distributed across subfrequencies but water filled across antennas. Assuming that there are M antennas and Q subfrequencies, each subfrequency is allocated by power $P_T/Q$. For each subfrequency j, the antenna i is allocated by power $p_i^{(j)}$. For M transmit antennas, the power $p_i^{(j)}$ is computed by:

$$p_i^{(j)} = \max\left(Z - \frac{\sigma^2}{\lambda_i^{(j)}}, 0\right); \quad \text{Equation (1)}$$

where $\lambda_i^{(j)}$ are the eigenvalues and Z is computed by:

$$\sum_{i=1}^{M} p_i^{(j)} = \frac{P_T}{Q}. \quad \text{Equation (2)}$$

The total power constraint should be satisfied such that $$\sum_{j=1}^{Q}\sum_{i=1}^{M} p_i^{(j)} = P_T. \quad \text{Equation (3)}$$

The power that is allocated to antenna i should be the sum of all the power of all subfrequencies that are allocated to antenna i as follows:

$$p_i = \sum_{j=1}^{Q} p_i^{(j)}. \quad \text{Equation (4)}$$

The total power constraint is also satisfied such that $$\sum_{i=1}^{M} p_i = P_T. \quad \text{Equation (5)}$$

If the power optimization is performed based on a feedback from the communicating entity, the power optimization unit 110 comprises a power calculation unit 112 and a power allocator 114. The power calculation unit 112 performs calculation of Equations (1)-(5). The power allocator 114 comprises a plurality of scalers that multiply the input signal, (i.e., the output signal of the power allocator 114 is scaled version of the input signal by some number). Power allocation is performed before signal transmission.

If the power optimization is performed based on received signal from the communicating entity without feedback, the power optimization unit 110 further comprises a channel state information (CSI) estimator 118 and a CSI processor 116. The CSI estimator 118 performs channel estimation to obtain CSI, (i.e., a channel matrix H between each transmit antenna and each receive antenna). The channel estimator 118 generates the channel matrix by estimating the channel impulse responses either in frequency domain or generates it in time domain and then converts it to frequency domain. The channel matrix H is forwarded to the CSI processor 116. The CSI processor is equivalent to SVD unit at the receiver which will be explained in detail later.

FIG. 2 is a block diagram of a transmitter 200 for joint frequency-antenna domain power allocation. The transmitter 200 comprises a S/P converter 202, a modulator 204, a fast Fourier transform (FFT) unit 206, a mixer 208, an inverse FFT (IFFT) unit 210, a CP inserter 212, multi-antennas 214 and a power optimization unit 216. Input data is converted to a plurality of parallel data streams by the SIP converter 202 and the data streams are modulated by the modulator 204. The modulated data streams are converted to frequency domain signals containing Q subfrequency components by the FFT unit 206.

In this embodiment, the power allocation and water filling is performed in joint space-frequency domain. The power is not uniformly distributed across frequencies or antenna, but optimized for each subfrequency and antenna. Transmit power level of each Q subfrequency component is scaled by the mixer 208 in accordance with control signals from the power optimization unit 216. Then, the frequency domain data is converted back to time domain signals by the IFFT unit 210. CP is then inserted into the data streams by the CP inserter 212 for preventing interblock interference. The power optimization unit 216 scales transmit power for each antenna within the maximum allowable transmit power limit. The data streams are then forwarded to the antennas 214 for transmission. Transmit power is adjusted both in antenna domain and frequency domain.

Alternatively, the power allocation and water filling may be performed in frequency domain only by turning off the antenna domain transmit power control. In this case the power is uniformly distributed across antenna but optimized for each subfrequency component. In this embodiment, the power allocated to each antenna is $P_T/M$. The total power constraint for transmission should be satisfied such that $$\sum_{j=1}^{Q} p_i^{(j)} = \frac{P_T}{M}. \quad \text{Equation (6)}$$

Figure 4:
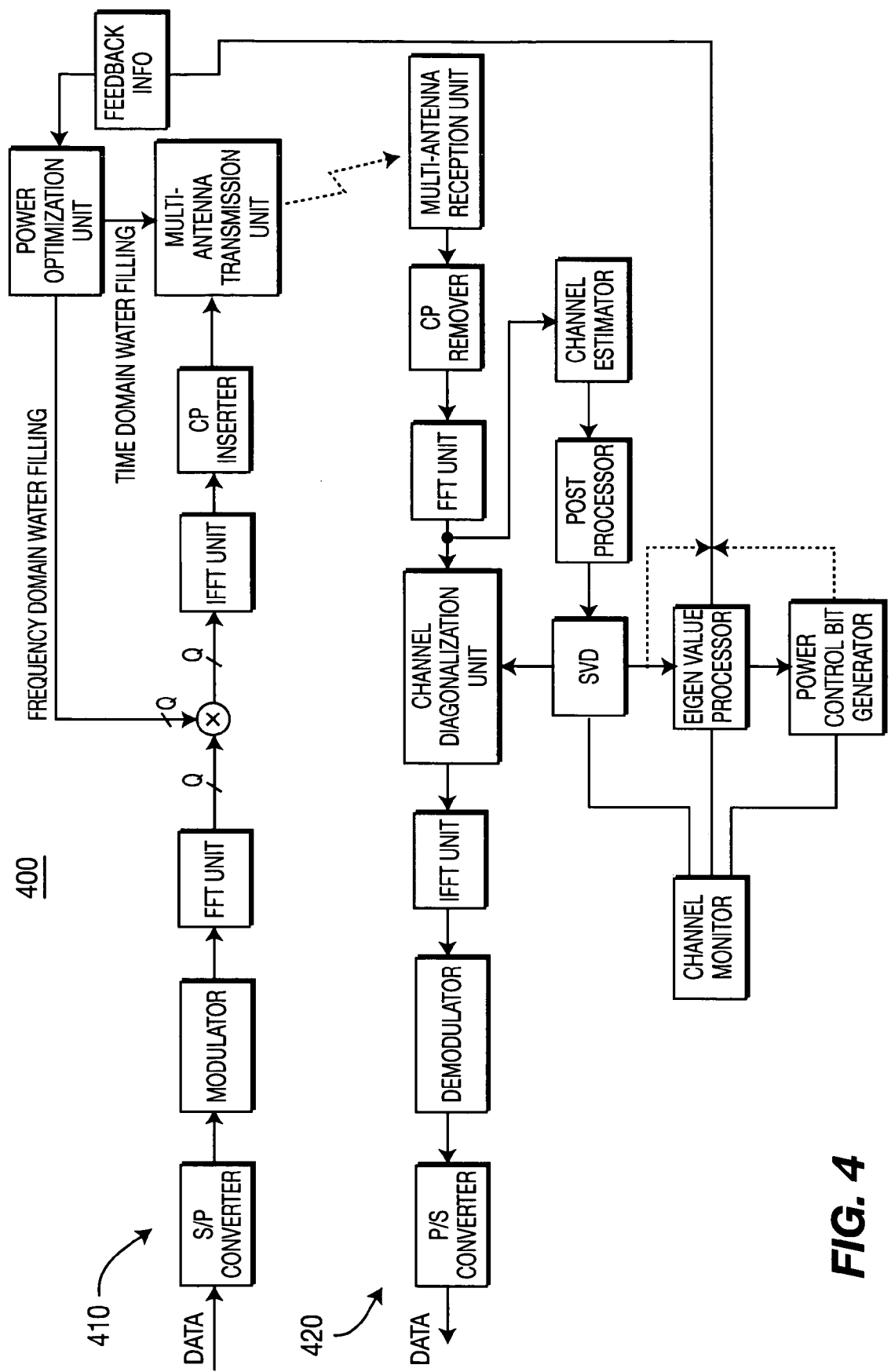
FIG. 4 is a block diagram of a system for transmit power control in accordance with another embodiment.

FIGS. 3 and 4 are block diagrams of systems 300, 400. The systems 300, 400 comprise a transmitter 310, 410 and a receiver 320, 420. The transmitter 310 in FIG. 3 performs only antenna domain transmit power control based on a feedback from the communicating entity and the transmitter 410 in FIG. 4 performs joint antenna-frequency domain transmit power control based on a feedback. The transmitter 310 in FIG. 3 is basically same to the transmitter 100 of FIG. 1 and the transmitter 410 in FIG. 4 is basically same to the transmitter 200 of FIG. 2. Therefore, the transmitters 310, 320 in FIGS. 3 and 4 will not be explained again for simplicity. The receiver 320 in FIG. 3 and the receiver 420 in FIG. 4 are basically same. Therefore, only receivers 320 in FIG. 3 will be explained hereinafter for simplicity.

The receiver 320 comprises multi-antennae 322 for reception, a CP remover 324, an FFT unit 326, a channel diagonalizer 328, an IFFT unit 330, a demodulator 332, a parallel-to-serial (P/S) converter 334, a channel estimator 336, a post processor 338 and a singular value decomposition (SVD) unit 340. Transmitted data is received by the multiple antennae 322. The CP is removed from the received data stream by the CP remover 324. The data stream is then forwarded to the FFT unit 326. The FFT unit 326 converts the data stream into a frequency domain. The output from the FFT unit is forwarded into the channel diagonalizer 328 and the channel estimator 336. The channel estimator 336 generates CSI, (i.e., a channel matrix H between each transmit antenna and each receive antenna). The channel estimator 336 generates the channel matrix by estimating the channel impulse responses either in frequency domain or generates it in time domain and then converts it to frequency domain. The channel matrix H is forwarded to the SVD unit 340, optionally via the post processor 338 for filtering.

The SVD unit 340 decomposes the channel matrix H into diagonal matrix D and the unitary matrix U and V such that:

$$H = UDV^H; \quad \text{Equation (7)}$$

where U and V are the unitary matrix composed of eigenvectors of the matrix $HH^H$ and $H^H H$, respectively and $U^H U = V^H V = I$. D is diagonal matrix composed of the square root of eigenvalues of $HH^H$.

The decomposed D, U and V matrices are sent to the channel diagonalizer 328. The channel diagonalizer 328 diagonalizes the received signals so that the interferences between antennas are eliminated. Suppose R, S denotes the frequency domain received signals and data, respectively. The received signal model in frequency domain can be expressed by:

$$\vec{R} = H\vec{S} + \vec{N}.$$ Equation (8)

The channel diagonalizer 328 diagonalizes the channel matrix H by applying the matrix $U^H$ and $D^{-1}V$ to the frequency domain received signal R. The resulting signal after diagonalization $\vec{R}_D$ becomes:

$$\vec{R}_D = D^{-1}VU^H\vec{R} = \vec{S} + D^{-1}VU^H\vec{N}.$$ Equation (9)

which is a frequency domain data plus noise.

To recover the time domain data s, IFFT is performed by the IFFT unit 330 on frequency domain data S ($\vec{S} = FFT(\vec{s})$) such that $\vec{s} = IFFT(\vec{S})$. The data is then processed by the demodulator 332 and the P/S converter 334.

Four main embodiments are provided for feedback of transmit power control information to the transmitter 310. First, the eigenvalue obtained by the SVD unit 340 may be sent back to the transmitter 310 as a feedback for adjusting transmit power. Second, transmit power level may be computed from the eigenvalue and sent back to the transmitter 310 as feedback information. Third, a power control bit, (or power control command), may be generated and sent back to the transmitter 310 as feedback information. Fourth, a hybrid method may be implemented to combine the foregoing three options.

The first option is to send the eigenvalue to the transmitter 310. The feedback information containing the eigenvalues $\lambda_i^{(j)}$ is sent to the transmitter 310 for implementing power allocation and water filling. Assuming M transmit antennas and Q subfrequencies, the size of feedback information using the first option is MQ real numbers per feedback.

The second option is that the receiver 320 further comprises an eigenvalue processor 342 for processing the eigenvalue obtained from the SVD unit 340 and computing the optimum transmit power level, and the computed transmit power level is sent back to the transmitter 310 as a feedback.

The feedback information containing the power level of each antenna and/or each subfrequency component is sent to the transmitter 310 for implementing power allocation and water filling. Depending on the system, the size of feedback information varies. For space-domain water filling, the feedback information containing power level of each antenna is sent back to the transmitter 310. For frequency-domain water filling, the feedback information containing power level of each subfrequency component is sent back to the transmitter 310. For joint space-frequency domain water filling, the feedback information containing power level of each antenna and each subfrequency component is sent back to the transmitter 310. The size of feedback information is M, Q and MQ real numbers for space-domain, frequency-domain and joint space-frequency domain power allocation and water filling.

In options 1 and 2, the feedback information is significantly reduced compared to feedback information of channel impulse responses or CSI. In such systems, 2MNL real numbers of time domain coefficients or 2MNQ real numbers of frequency domain coefficients are required for feedback. L is length of delay spread.

As a third option, the receiver 320 may further comprise a power control bit generator 344 for generating a power control bit, (or power control command), from the transmit power level computed by the eigenvalue processor 342. The feedback information containing the power control bit, $PCB_i^{(j)}$, is sent to the transmitter 310 for implementing power allocation and water filling. The $PCB_i^{(j)}$ may be generated based on the following algorithms:

3-step algorithm (2 bits):
  $PCB_i^{(j)}=00$, if power level needs an increase for antenna i and subfrequency j
  11, if power level needs a decrease for antenna i and subfrequency j
  Otherwise, if power level needs no increase or decrease 3-step algorithm with silence (1 bit):
  $PCB_i^{(j)}=0$, if power level needs an increase for antenna i and subfrequency j
  1, if power level needs a decrease for antenna i and subfrequency j
  Silence (no value is sent), if power level needs no increase or decrease 2-step algorithm (1 bit):
  $PCB_i^{(j)}=0$, if power level needs an increase for antenna i and subfrequency j
  1, if power level needs a decrease for antenna i and subfrequency j For space-domain water filling, the feedback information containing $PCB_i$, i=1, 2, ..., M are sent back to the transmitter 310. For frequency-domain water filling, the feedback information containing $PCB^{(j)}$, j=1, 2, ..., Q are sent back to the transmitter 310. For joint space-frequency domain water filling, the feedback information containing $PCB_i^{(j)}$, i=1, 2, ..., M and j=1, 2, ..., Q are sent back to the transmitter 310. The size of feedback information of PCB is 2M, 2Q and 2MQ bits for space-domain, frequency-domain and joint space-frequency domain water filling for 3-step power control algorithm. The size of feedback information of PCB is M, Q and MQ bits for space-domain, frequency-domain and joint space-frequency domain water filling for 3-step power control with silence or 2-step power control algorithm. The third option using PCB is the fastest way among the above three options in terms of reduced feedback size and speed of transmit power control at the transmitter 310.

As a fourth option, the receiver 320 may further comprise a channel state monitor 346 for monitoring a channel condition and/or vehicle speed and for selecting appropriate form of feedback. The receiver 310 includes the SVD unit 340, the eigenvalue processor 342 and/or the power control bit generator 344, and one of the feedbacks is selected by the channel state monitor 346. Based on the measured channel conditions or vehicle speed, the options 1, 2 or 3 are selected.

In a fast fading condition or high speed environment when the power level needs a jump, option 1, option 2 or option 3 with a large step size can be used. In a slow fading condition or low speed or static environment when power level is in a more stable condition, the option 3 with a small step size may be used. Variable or adaptive step sizes for option 3 can be applied for different channel conditions or vehicle speeds.

Although SVD is provided as a preferred embodiment, SVD can be replaced with eigenvalue decomposition for the equivalent operations and functions.

Figure 5:
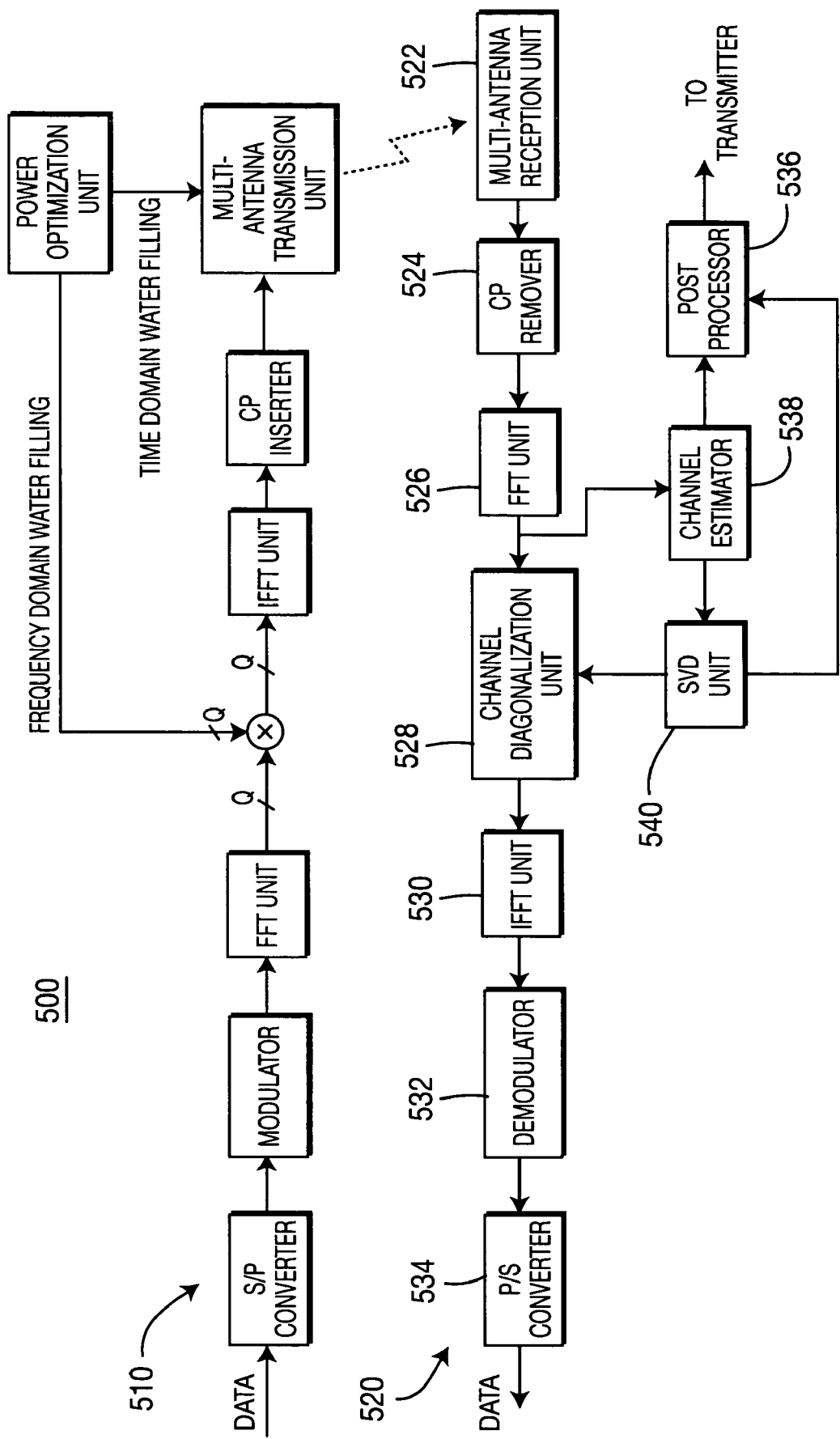
FIG. 5 is a block diagram of a system for transmit power control in accordance with yet another embodiment.

FIG. 5 is a block diagram of a system 500 in accordance with another embodiment of the present invention. The system 500 comprises a transmitter 510 and a receiver 520. The transmitter 510 in FIG. 5 is basically same to the transmitter 200 of FIG. 2. Therefore, the transmitter 510 in FIG. 5 will not be explained again for simplicity and only the receiver 520 will be explained hereinafter.

The receiver 520 comprises multi-antennae 522 for reception, a CP remover 524, an FFT unit 526, a channel diagonalizer 528, an IFFT unit 530, a demodulator 532, a parallel-to-serial (P/S) converter 534, a channel estimator 536, a post processor 538 and a singular value decomposition (SVD) unit 540. Transmitted data is received by the multiple antennae 522. The CP is removed from the received data stream by the CP remover 524. The data stream is then forwarded to the FFT unit 526. The FFT unit 526 converts the data stream into a frequency domain. The output from the FFT unit 526 is forwarded into the channel diagonalizer 528 and the channel estimator 536. The channel estimator 536 generates CSI, (i.e., a channel matrix H between each transmit antenna and each receive antenna). The channel matrix is forwarded to the SVD unit 540 and the post processor 538.

The SVD unit decomposes the channel matrix into D, U and V matrices and the D, U and V matrices are forwarded to the channel diagonalizer 228 and the post processor 538. The post processor 538 optionally filters the CSI generated by the channel estimator 536 and sends a feedback to the transmitter 510. The feedback may be one of an eigenvalue, a transmit power level or a power control bit. The feedback can also be a raw CSI without being post processed or the post processed CSI depending on implementation.

The channel diagonalizer 528 diagonalizes the received signals so that the interferences between antennas are eliminated. To recover the time domain data, IFFT is performed on frequency domain data by the IFFT unit 530. The data is then processed by the demodulator 532 and the P/S converter 534.

Figure 6:
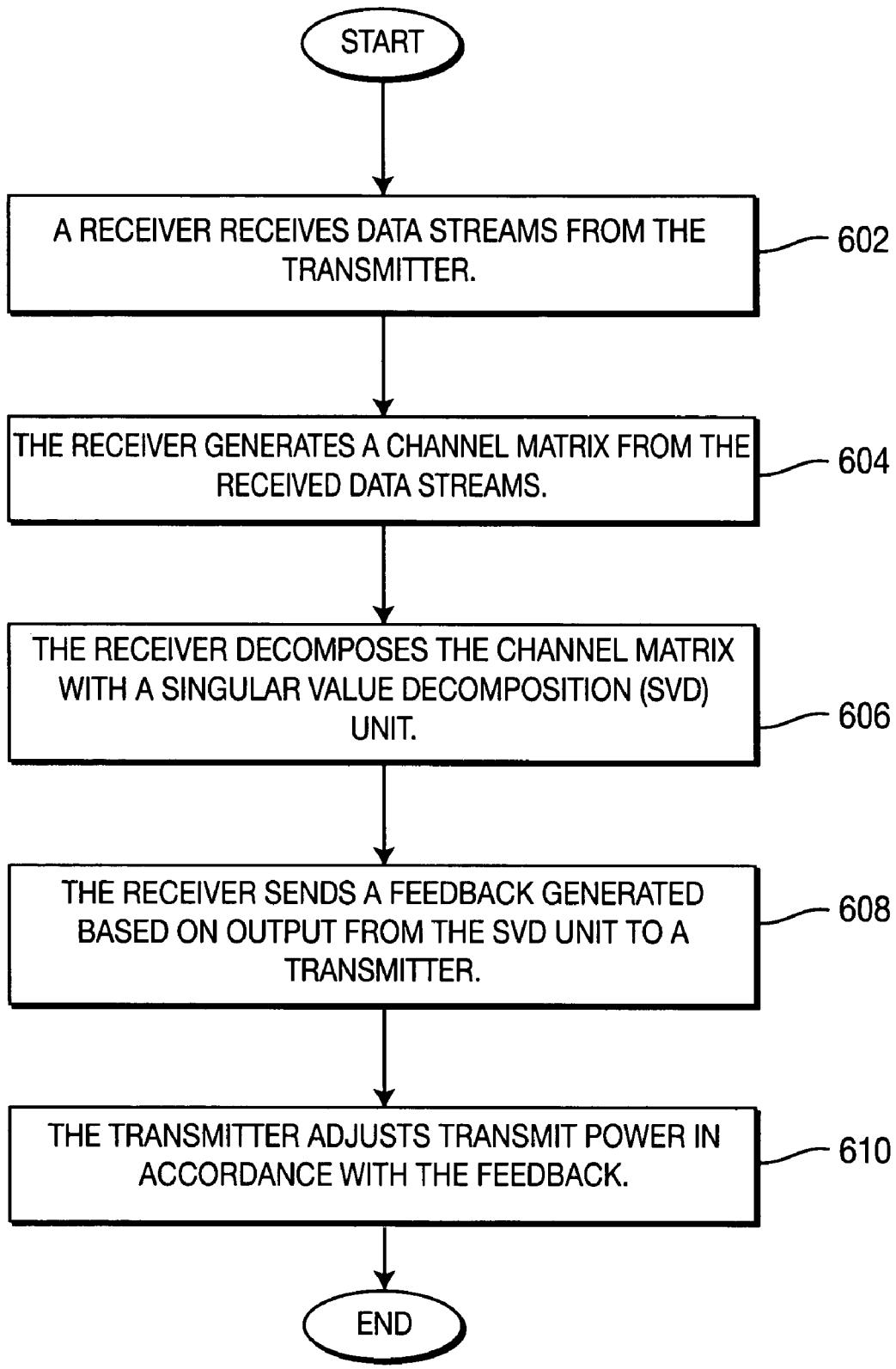
FIG. 6 is a flow diagram of a process for transmit power control.

FIG. 6 is a flow diagram of a process 600 for transmit power control in a MIMO wireless communication system. Both a transmitter and a receiver comprise a plurality of antennas for transmission and reception. A receiver receives data streams transmitted with multiple transmit antennas from a transmitter (step 602). The receiver generates a channel matrix H between multiple transmit antennae and multiple receive antennas from the received data streams (step 604). The receiver then decomposes the channel matrix H into diagonal matrix D and the unitary matrix U and V with a singular value decomposition (SVD) unit as shown in Equation (7) (step 606). The receiver sends a feedback generated based on output from the SVD unit to the transmitter (step 608). The transmitter then adjusts transmit power in accordance with the feedback (step 610).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A multiple input multiple output (MIMO) receiver for transmit power control, the receiver comprising:
   a channel estimator configured to estimate a channel response matrix from a signal received from a transmitter;
   a channel response matrix decomposition unit configured to decompose the channel response matrix to generate an eigenvalue;
   an eigenvalue processor configured to calculate a transmit power level from the generated eigenvalue;
   a power control bit generator configured to generate a power control bit from the calculated transmit power level, the power control bit having a varying step size including at least one of a large step size and a small step size; and
   a channel monitor configured to:
      measure at least one of a channel fading condition and a vehicle speed of the estimated channel response matrix and
      select to transmit to the transmitter, based on the measured at least one of the channel fading condition and the vehicle speed, one of the eigenvalue, the transmit power level, and the power control bit,
      the channel monitor selecting to transmit to the transmitter one of the eigenvalue, the transmit power level and the power control bit having the large step size as feedback on a condition that the measured at least one of the channel fading condition and the vehicle speed are respectively a fast fading channel condition and a high vehicle speed, and
      the channel monitor selecting to transmit to the transmitter the power control bit having the small step size as feedback on a condition that the measured at least one of the channel fading condition and the vehicle speed are respectively a slow fading channel condition and a low vehicle speed.

2. The receiver of claim 1 wherein the channel response matrix decomposition unit is configured to decompose the channel response matrix by eigenvalue decomposition.

3. The receiver of claim 1 wherein the channel response matrix decomposition unit is configured to decompose the channel response matrix by singular value decomposition (SVD).

4. The receiver of claim 1 wherein the channel monitor is configured to transmit the power control bit in one of a 3-step mode, a 3-step with silence mode and a 2-step mode.

5. A method for transmit power control for multiple-input multiple-output (MIMO) transmission, the method comprising: receiving data streams from a transmitter; estimating a channel response matrix from the received data streams; decomposing the channel response matrix to generate an eigenvalue; measuring at least one of a channel fading condition and a vehicle speed of the estimated channel response matrix; selecting to transmit to the transmitter, based on the measured at least one of the channel fading condition and the vehicle speed, one of an eigenvalue, a transmit power level and a power control bit, the power control bit having a varying step size including at least one of a large step size and a small step size; and generating and transmitting to the transmitter: one of the (1) eigenvalue, (2) the transmit power level and (3) the power control bit, having the large step size as feedback on a condition that the measured at least one of the channel fading condition and the vehicle speed are respectively a fast fading channel condition and a high vehicle speed, and the power control bit having the small step size as feedback on a condition that the measured at least one of the channel fading condition and the vehicle speed are respectively a slow fading condition and a low vehicle speed.

6. The method of claim 5 wherein the channel matrix decomposition is performed by eigenvalue decomposition.

7. The method of claim 5 wherein the channel matrix decomposition is a singular value decomposition (SVD).

8. The method of claim 5 wherein the power control bit is transmitted in one of a 3-step mode, a 3-step with silence mode and a 2-step mode.

* * * * *

UNITED STATES PATENT AND TRADEMARK OFFICE
CERTIFICATE OF CORRECTION

PATENT NO. : 7,643,843 B2
APPLICATION NO. : 11/152511
DATED : January 5, 2010
INVENTOR(S) : Pan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Sixteenth Day of November, 2010

David J. Kappos
*Director of the United States Patent and Trademark Office*